(12) United States Patent
Choi

(10) Patent No.: US 6,462,709 B1
(45) Date of Patent: Oct. 8, 2002

(54) SIGNAL PROCESSING METHOD AND APPARATUS FOR COMPUTING AN OPTIMAL WEIGHT VECTOR OF AN ADAPTIVE ANTENNA ARRAY SYSTEM

(75) Inventor: Seung-Won Choi, Seoul (KR)

(73) Assignee: SAS Technologies Co., Ltd., Seoul (KR)

( * ) Notice: Subject to any disclaimer, the term of this patent is extended or adjusted under 35 U.S.C. 154(b) by 0 days.

(21) Appl. No.: 09/857,197

(22) PCT Filed: Dec. 22, 1999

(86) PCT No.: PCT/KR99/00812

§ 371 (c)(1),
(2), (4) Date: Jun. 21, 2001

(87) PCT Pub. No.: WO00/38276

PCT Pub. Date: Jun. 29, 2000

(30) Foreign Application Priority Data

Dec. 22, 1998 (KR) .......................................... 98-57417

(51) Int. Cl.[7] ................................................ G01S 3/16
(52) U.S. Cl. ...................................................... 342/378
(58) Field of Search ................................ 342/368, 378, 342/382, 385

(56) References Cited

U.S. PATENT DOCUMENTS 5,808,913 A    9/1998  Choi et al.

FOREIGN PATENT DOCUMENTS

| KR | 97-60573 | 8/1997 |
| KR | 97-60574 | 8/1997 |
| KR | 97-78053 | 12/1997 |
| KR | 98-6623 | 3/1998 |
| KR | 1999-013271 | 2/1999 |

OTHER PUBLICATIONS

English Language Abstract of KR 97-78053.
English Language Abstract of KR 97-60573.
English Language Abstract of KR 97-60574.
English Language Abstract of KR 98-6623.
English Language Abstract of KR 1999-013271.
Ayman F. Naguib, "Adaptive Antennas for CDMA Wireless Networks", Ph.D. Dissertation, Department of Electrical Engineering, Stanford University, Aug. 1996.
D. Shim et al., "A New Blind Adaptive Algorithm Based on the Language's Formula for A Smart Antenna System in CDMA Mobile Communications", IEEE VTC'98, pp. 660–1664.
Seungwon Choi et al., "Design of an Adaptive Antenna Array for Tracking the Source of Maximum Power and its Application to CDMA Mobile Communications", IEEE Transactions on Antennas and Propagation, vol. 45, No. 9, Sep. 1997, pp. 1393–1404.
David J. Farina et al., "Adaptive Array Processing for Pulsed Communication Systems", IEEE Transactions on Communications, vol. 43, No. 10, Oct. 1995, pp. 2556–2560.

*Primary Examiner*—Dao Phan
(74) *Attorney, Agent, or Firm*—Greenblum & Bernstein, P.L.C.

(57) ABSTRACT

This invention relates to a signal processing method and apparatus for an adaptive array antenna. The objective is to suggest an adaptive procedure of computing the suboptimal weight vector for an array antenna system that provides a beampattern having its maximum gain along the direction of the mobile target signal source in a blind signal environment, where the transmitted data are not known (or not to be estimated) at the receiver. It is the ultimate goal of this invention to suggest a practical way of enhancing both the communication quality and communication capacity through the optimal weight vector of the array system that maximizes SINR(Signal to Interference+Noise Ratio). In order to achieve this goal, the method of Lagrange multiplier is modified in such a way that the suboptimal weight vector is produced with the computational load of about O(8N), which has been found to be small enough for the real-time processing of signals in most land mobile communications with the digital signal processor (DSP) off the shelf, where N denotes the number of antenna elements of the array.

54 Claims, 2 Drawing Sheets

SIGNAL PROCESSING METHOD AND APPARATUS FOR COMPUTING AN OPTIMAL WEIGHT VECTOR OF AN ADAPTIVE ANTENNA ARRAY SYSTEM

TECHNICAL FIELD

The present invention relates to a technique utilizing an array antenna; and, more particularly, to a method and apparatus for optimizing the beam pattern of an array antenna system and its applications to transmitting and receiving systems by finding a weight vector capable of maximizing the signal to interference plus noise ratio in as accurate and simple way as possible.

BACKGROUND ART

An antenna system that improves the performance of a wireless communication with a proper beam pattern is generally referred to as "smart antenna system (SAS)". A theory related to the design of the SAS from a weight vector that maximizes the signal to interference plus noise ratio has been published in a prior art, [1]Ayman F. Naguib, "Adaptive Antennas for CDMA Wireless Networks", Ph. D. Dissertation, Dept of Electrical Engineering, Stanford University, August 1996. In [1], the weight vector is obtained from an eigenvector corresponding to the largest eigenvalue of a generalized eigen-problem as follows:

$$R_y w = \eta R_u w \qquad (1)$$

where $R_y$ is the autocovariance matrix of the received (RX) signal vector y, which is obtained from the despreader output, $R_u$ is the autocovariance matrix of the undesired signal vector u, and $\lambda$ and w are the eigenvalue and eigenvector of the eigen-problem shown in (1), respectively. In short, $R_y = E[y \, y^H]$ and $R_u = E[u \, u^H]$, where $E[*]$ denotes the expectation of $*$.

Throughout this manuscript, vector and matrix quantities are written in lower case and upper case, respectively.

From [1], it can be observed that the optimal weight vector is the eigenvector corresponding to the largest eigenvalue of the eigen-problem shown in (1). However, since the autocovariance matrices $R_y$ and $R_u$ should be computed from the expectation of the power of y and u, it is never possible in actual signal environment to form the equation (1) at every snapshot for each of which the optimal weight vector should be computed. Even if the equation is formed somehow, since the computation of an eigenvector corresponding to the largest eigenvalue of a generalized eigen-problem requires a lot of computations, there arises many serious difficulties in applying the theory of [1] to the actual wireless communication world.

Recently, as the demand of the mobile communication and other wireless telecommunications increases rapidly, there arises an extremely keen need for developing the adaptive antenna array system that adopts an optimal weight vector in as accurate and simple way as possible. However, due to the limit of conventional techniques as mentioned above, it seems impossible to cope with the rapidly growing demand with the current techniques. Therefore, it is extremely and desperately required to develop a new technology for designing a smart antenna system enhancing the communication capacity and communication quality with a realizable complexity without loss of accuracy because of the simplicity.

DISCLOSURE OF INVENTION

In order to overcome the composite problems in the conventional techniques and eventually to cope with the drastically increasing demand of the wireless communications, this invention presents a simple and accurate way of computing the weight vector that maximizes the signal to interference plus noise ratio. By applying the smart antenna system designed by the technique provided in this invention into practical wireless communications, it is indeed possible to tremendously increase the communication capacity and enhance the communication quality. The objective of this invention is to suggest an optimal beamforming method and communication apparatus that applies this method by providing the computation of an optimal weight vector for an antenna array system operating in a time-vary signal environment such as mobile communications.

In order to accomplish this objective, this invention provides a signal processing method and apparatus that generates a weight vector which maximizes the signal to interference plus noise ratio from the received signal vectors x and y, where x (pre-correlation signal vector) and y (post-correlation signal vector) are the received signal vectors obtained at the input and output of the correlators, i.e., despreading unit, which correlate the received signals with the PN (pseudo-random noise) code of the desired signal in a given CDMA system, respectively.

BRIEF DESCRIPTION OF DRAWINGS

The above and other objects and features of the instant invention will become apparent from the following description of preferred embodiments taken in conjunction with the accompanying drawings, in which.

BEST MODE FOR CARRYING OUT THE INVENTION

Figure 1:
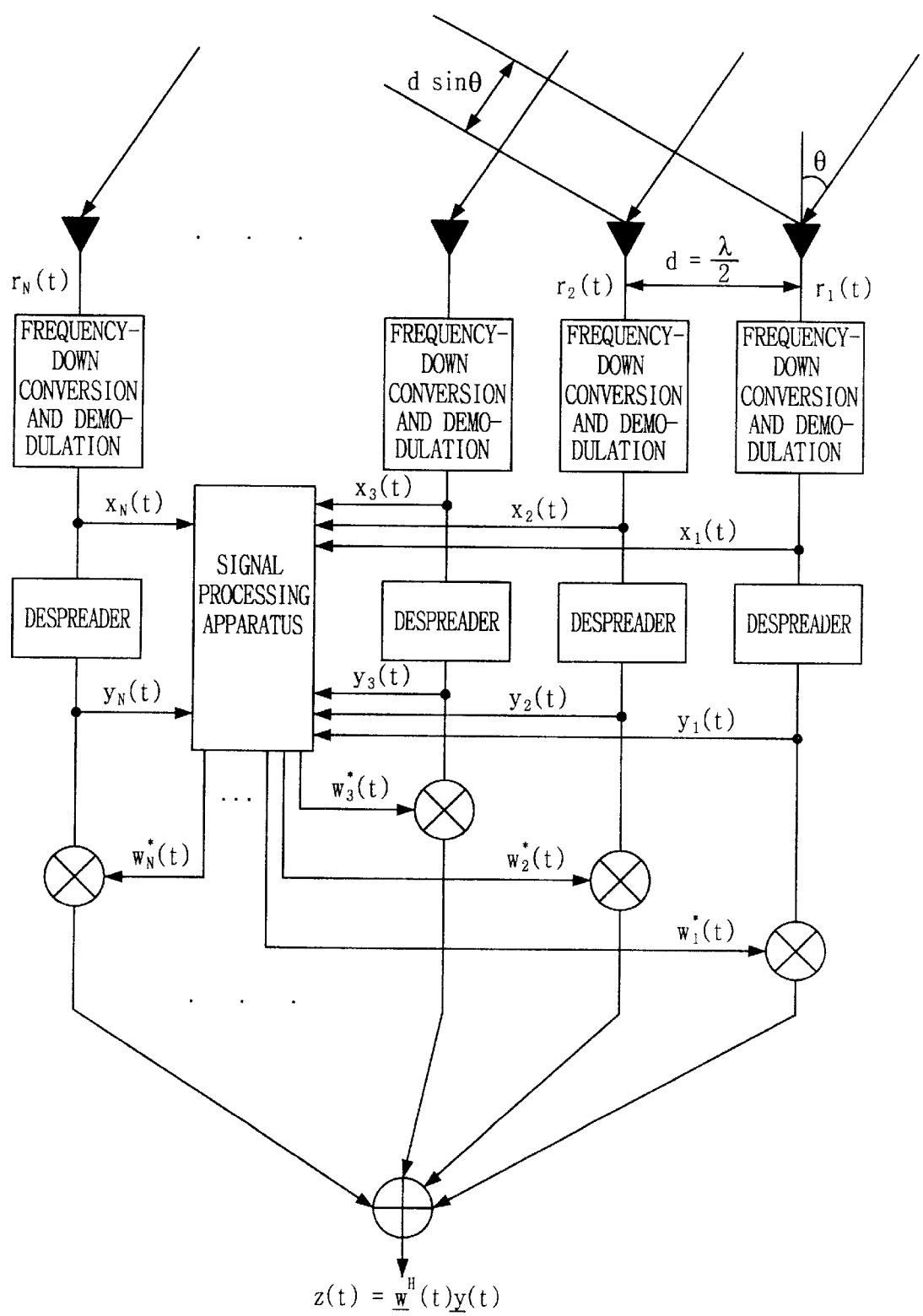
FIG. 1 illustrates a block diagram illustrating the adaptive antenna array system including a signal processing apparatus in accordance with the present invention.
Figure 2:
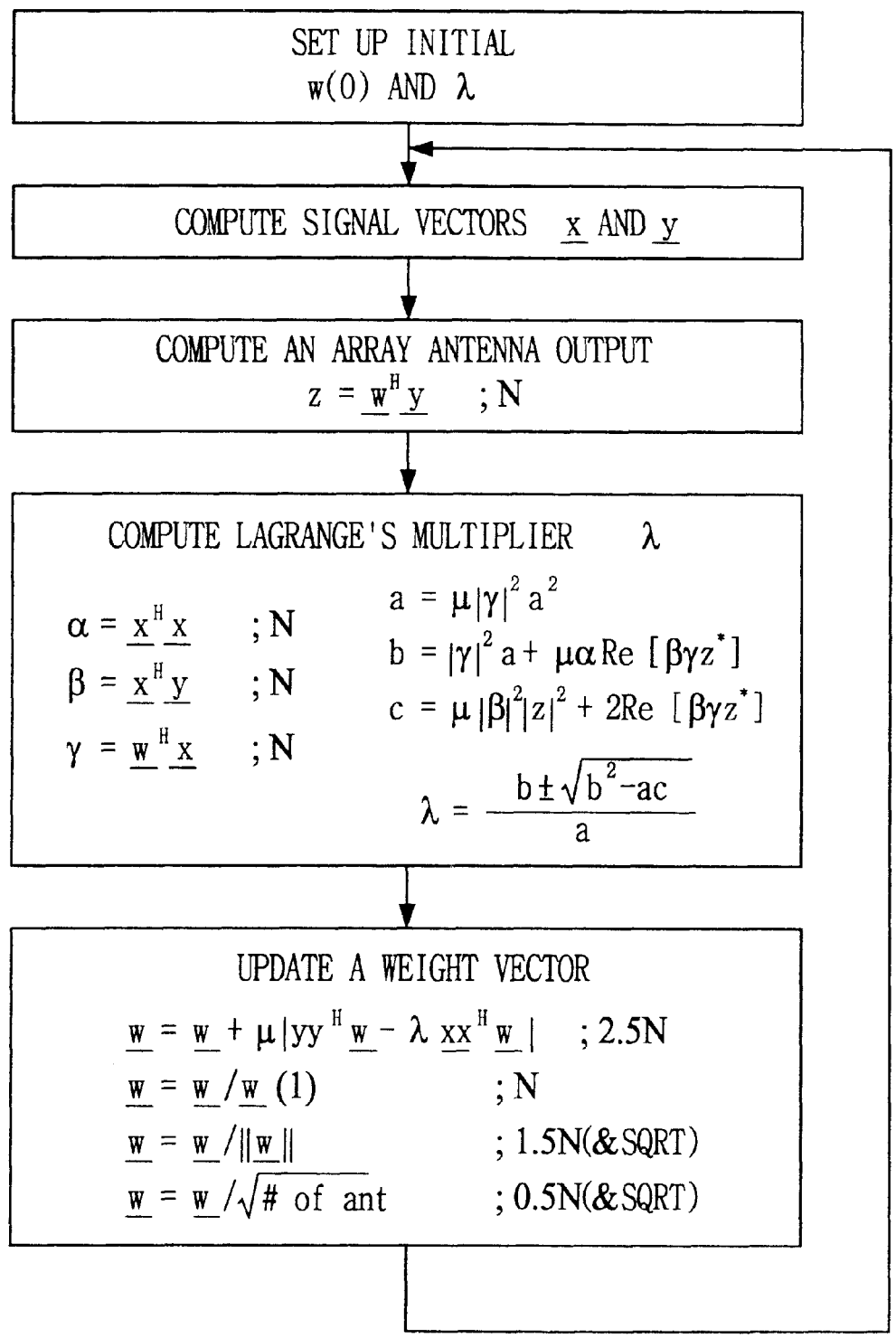
FIG. 2 illustrates a flowchart describing a preferable embodiment of the signal processing method of computing an optimal weight vector of an adaptive antenna array system in accordance with the present invention.

FIG. 2 illustrates a flowchart describing a preferable embodiment of the signal processing method of computing an optimal weight vector of an adaptive antenna array system in accordance with the present invention.

As described in [1], the weight vector w that maximizes the signal to interference plus noise ratio can be found from an eigenvector corresponding to the largest eigenvalue of the eigen-problem shown in (1). It is important to note that the autocovariance matrix of the undesired signals $R_u$ can be written as $$R_u = \frac{G}{G-1} R_x - \frac{1}{G-1} R_y \qquad (2)$$

where G is the processing gain of a given CDMA system.

Combing (2) and (1), it can be observed that to compute the weight vector w maximizing the signal to interference plus noise ratio is equivalent to compute an eigenvector corresponding to the largest eigenvalue of the following eigen-problem:

$$R_y w = \lambda R_x w \qquad (3)$$

Also, equivalently, it is possible to compute the target eigenvector by finding an eigenvector corresponding to the smallest eigenvalue of the following eigen-problem:

$$R_x w = \lambda R_y w \tag{4}$$

The weight vector w, i.e., the solution of the eigenproblem (3) or (4), can easily be found by utilizing the well known technique, Lagrange's formula, after modifying it with the signal processing technique presented in this invention. The theoretical background and application method of the signal processing technique based on the Lagrange's formula is well described in our previous works including [2] D. Shim and S. Choi, "A new blind adaptive algorithm based on Lagrange's formula for a real-time design of a smart antenna", Proc. IEEE VTC98, vol. 3, Montreal, Canada, May 1998, pp. 1660–1664.

Weight Vector Optimization Based on Lagrange's Formula

Let's first derive an adaptive procedure of computing the weight vector w from the maximum eigenvector of (3). Then, the adaptive procedure of finding the weight vector from the minimum eigenvector of (4) can easily be derived by exchanging the parameters of x (pre-correlation signal index) and y (post-correlation signal index).

Consider a functional and constraint as given in (5) in order to find the weight vector w from the maximum eigenvector of (3) by utilizing the Lagrange's formula:

$$\text{Maximize } w^H R_y w + \lambda(1 - w^H R_x w) \text{ subject to } w^H R_x w = 1 \tag{5}$$

where $\lambda$ is Lagrange's multiplier which approaches the maximum eigenvalue of (3) as the iteration is proceeded. Starting from an initial guess $w(0)$, the adaptive procedure based on Lagrange's formula updates the weight vector at each snapshot in order to converge to the weight vector satisfying (5) as follows:

$$w(n+1) = w(n) + \frac{1}{2}\mu \nabla(n) \tag{6}$$

where n is the snapshot index, $\mu$ denotes the adaptive gain, and is the gradient vector $\nabla(n)$ of the functional (5) with respect to the weight vector. Since the way of setting $\mu$ and $\nabla(n)$ satisfying (5) has already been disclosed in [2] and our other previous works such as Korean patent No. 17931 issued on May 25, 1996 and U.S. Pat. No. 5,808,913 issued on 1998, this invention just discloses how to determine the weight vector with the maximum eigenvector of (3) and the minimum eigenvector of (4). In order to compute the weight vector from the minimum eigenvector of (4) instead of from the maximum eigenvector of (3), it is required not only to exchange the parameters of x (pre-correlation signal index) and y (post-correlation signal index) but also to change the positive sign in (6) with negative one. Then, the functional (5) would be minimized. These two procedures, i.e., maximization and minimization procedure, are introduced as two distinct preferable embodiments in this invention.

In addition to the adaptive procedure of computing the optimal weight vector, this invention also discloses a way of determining a reference antenna element in an antenna array system in such a way that the resultant array system can exhibit the best performance in real signal environments. The way of determining the reference antenna element exposed in this invention seems to provide the best performance not only for the array system designed by the present technique of this invention but also for the general array systems designed by other techniques. The problem of determining the reference antenna element in a given array system having N elements is to determine how the phase of the received signal at each antenna element is to be synchronized. In other words, the phase of the received signal at each antenna element is synchronized to that of the reference antenna element. In order to understand the phase synchronization, let's consider the received signal obtained at the output of the despreader for the mth antenna element as follows:

$$y_m(t) = \sum_{n=1}^{J} s(t) \sum_{i=1}^{L} e^{j2\pi(f_D \cos\zeta_{i,n} t - f_c \tau_{i,n})} e^{-j(m-m_0)\pi \sin\theta_{i,n}} + \tag{7}$$

$$\text{interference} + \text{noise}$$

where $y_m(t)$ is the received signal at the mth antenna element, n in $$\sum_{n=1}^{J}$$

is the finger index, J is the total number of fingers (=number of multipath clusters), s(t) is the transmitted signal from the desired user, i is the index of the scattered components in $$\sum_{i=1}^{L},$$

and L is the total number of scattered components in a path cluster. Note that $e^{j2\pi(f_D \cos\zeta_{i,n} t - f_c \tau_{i,n})}$ denotes the fading term including the Doppler shift and propagation delay and $e^{-j(m-m_0)\pi \sin\theta_{i,n}}$ is the inter-element phase delay. Note that, from the term $e^{-j(m-m_0)\pi \sin\theta_{i,n}}$, it can be observed that the signal model shown in (7) considers the angle spread and the reference antenna element is $m_0$th element. As mentioned earlier, to determine the reference antenna element is to determine the value for $m_0$.

The most serious problem in compensating the carrier phase delay for the desired signal s(t) in a given array system is that there should be only one value to compensate the carrier phase delay while the carrier phase delay for the desired signal s(t) is different at each antenna element because of the angle spread of the desired signal. The carrier phase compensation should indeed be only one value because the inter-element phase differences of the desired signal, which is determined by the incident angle of the desired signal, should be maintained to provide an appropriate beam pattern with an optimal weight vector. At the reference antenna, by substituting $m_0$ for m in (7), the exact value for the carrier phase delay can be obtained, which in turn enables the exact phase delay compensation. However, as the antenna element located farther and farther from the reference element, i.e., $|m - m_0|$ increases, the carrier phase delay becomes different from that at the reference antenna element. For example, when the array consists of 8 elements, if the reference antenna element has been determined with an element located at one end of the array geometry, the element located at the other end is separated from this reference element by $3.5\lambda$, where $\lambda$ denotes the wavelength at the carrier frequency, which will cause a lot of errors in carrier phase compensation. Therefore, it is strongly recommended to determine the reference antenna element with the one located at the center of the array geometry such that the distance of the farthest element from the reference element can be minimized, which in turn will minimize the error in carrier phase delay compensation.

As mentioned earlier, the problem arising in the compensation of carrier phase delay is due to the mutually contradictory facts that the exact phase delay to be compensated is different at each antenna element because of the angle spread of the desired signal while the compensation can be done only with a single value. Therefore, the compensation of the carrier phase delay for the desired signal can exactly be performed only at the reference antenna element and the compensation error increases as the antenna location is farther and farther from the reference antenna element. For example, when the number of antenna elements is 8, if an element located at one end of the array has been designated as being the reference element, the element at the other end will be separated from that reference element by about 3.5 wavelengths, which will cause a remarkable error in phase compensation. If the third or fourth antenna element has been designated as the reference one, then the element at the end of the array will be separated only by 2 wavelengths. Consequently, the error in phase compensation can be reduced considerably by selecting the reference antenna element with the one located at the center of the array geometry. Through the computer simulations, it has been found that the BER (bit error rate) due to the erroneous phase compensation can be reduced nearly one tenth by selecting the center element as the reference one.

PREFERABLE EMBODIMENTS

First Preferable Embodiment

As the first preferable embodiment, this invention discloses a method of computing the weight vector with an eigenvector corresponding to the largest eigenvalue of the eigen-problem (3) by updating the weight vector through the procedure of (7) at each snapshot such that (5) can be maximized, which is an application of the prior art, Lagrange's formula. The adaptive procedure based on the Lagrange's formula can be applied to mobile communications through the three steps as follows:

<Initial Stage> Set up an initial guess for the weight vector w. For an efficient convergence, it is recommended have the normalized and received signal vector after the despreading procedure as the initial value, i.e., $y(0)/\|y(0)\|$ where $\|y(0)\|=\sqrt{(y^H(0)y(0))}$.

<Step 1> Update the autocovariance matrices, $R_x$ (pre-correlation autocovariance matrix) and $R_y$ (post-correlation autocovariance matrix), with the received signal vector x(n) (a pre-correlation signal vector) and y(n) (post-correlation signal vector) of the present snapshot through the procedure shown in (8) and (9), respectively:

$$R_x \leftarrow fR_x + x(n)x(n)^H \quad (8)$$

$$R_y \leftarrow fR_y + y(n)y(n)^H \quad (9)$$

where the matrices are formed as $R_x = x(0)x(0)^H$ and $R_y = y(0)y(0)^H$ at the initial stage, f is a predetermined forgetting factor in the interval $0 < f \leq 1$, and the superscript H is the Hermitan operator.

<Step 2> Compute the Lagrange multiplier $\lambda$ at the present snapshot from the present weight vector w, the autocovariance matrices $R_x$ and $R_y$ which have been updated by (8) and (9), respectively, and a preset adaptive gain $\mu$ as follows:

$$\lambda = \frac{\lfloor b - \sqrt{(b^2 - ac)} \rfloor}{a} \quad (10)$$

where $$a = \mu w^H R_x^3 w, \quad b = \frac{(2w^H R_x^2 w + \mu w^H R_x^2 w + \mu w^H R_y R_x^2 w)}{2}$$

and $c = \mu w^H R_y R_x R_y w + w^H R_y R_x w + w^H R_x R_y w$.

<Step 3> Update the weight vector utilizing the present weight vector w, said Lagrange multiplier $\lambda$, said adaptive gain $\mu$, and autocovariance matrices $R_x$ and $R_y$ as follows:

$$w \leftarrow w + \mu[R_y w - \lambda R_x w] \quad (11)$$

It is possible to include an additional step for normalizing the weight vector to a unit magnitude after the update procedure shown in (11). In addition, in order to synchronize the phase of the signal at each antenna channel to the phase of the signal induced at the reference antenna element, it is recommended to normalize the weight vector after dividing every element of the resultant weight vector obtained in (11) by the weight corresponding to the reference antenna element.

The final array output z is obtained from the inner product between the present weight vector w and the post-correlation signal vector y, i.e., $z = w^H y$. The weight vector is updated after the above written 3 steps have been executed at each snapshot. In order for the communication of the present invention to be continuously performed, the procedure must be returned to <Step 1> after <Step 3> with an increased snapshot index by 1. Since there are matrix operations, the computational load of the adaptive procedure shown in this preferable embodiment is $O(N^2)$ where N is the number of antenna elements.

Second Preferable Embodiment

In this preferable embodiment, an adaptive procedure of computing an eigenvector corresponding to the smallest eigenvalue of (4). The technique ultimately searches for the same weight vector that converges to an eigenvector corresponding to the largest eigenvalue of (3). To find the target eigenvector corresponding to the smallest eigenvalue of (4), the signal index x representing pre-correlation and y representing post-correlation are interchanged in <Step 3> and the sign of (11) is changed as follows:

$$w \leftarrow w - \mu[R_x w - \lambda R_y w] \quad (12)$$

The adaptive procedure of finding an eigenvector corresponding to the smallest eigenvalue of (4), instead of that corresponding to the largest eigenvalue of (3), can be summarized as follows:

<Initial stage> Set up an initial guess w.

<Step 1> Update the autocovariance matrices, $R_x$ denoting a pre-correlation autocovariance matrix and $R_y$ denoting a post-correlation autocovariance matrix, with the received signal vector x(n) denoting a pre-correlation signal vector and y(n) denoting a post-correlation signal vector of the present snapshot through the procedure shown in (8) and (9), respectively.

<Step 2> Compute the Lagrange multiplier $\lambda$ at the present snapshot from the present weight vector w, the autocovariance matrices $R_x$ and $R_y$ which have been updated by (8) and (9), respectively, and a preset adaptive gain $\mu$ as follows:

$$\lambda = \frac{\lfloor b - \sqrt{(b^2 - ac)} \rfloor}{a} \quad (13)$$

where $$a = \mu w^H R_y^3 w, \quad b = \frac{(-2w^H R_y^2 w + \mu w^H R_y^2 R_x w + \mu w^H R_x R_y^2 w)}{2}$$

and $c = \mu w^H R_x R_y R_x w - w^H R_{yR_x} w - w^H R_x R_y w$.

<Step 3> Update the weight vector utilizing the prsent weight vector w, said Lagrange multiplier $\lambda$, said adaptive gain $\mu$, and autocovariance matrices $R_x$ and $R_y$ as shown in (12). n It is possible to include an additional step for normalizing the weight vector to a unit magnitude after the update procedure shown in (12). In addition, in order to synchronize the phase of the signal at each antenna channel to the phase of the signal induced at the reference antenna element, it is recommended to normalize the weight vector after dividing every element of the resultant weight vector obtained in (12) by the weight corresponding to the reference antenna element.

The final array output z is obtained from the inner product between the present weight vector w and the post-correlation signal vector y, i.e., $z = w^H y$. The weight vector is updated after the above written 3 steps have been executed at each snapshot. In order for the communication of the present invention to be continuously performed, the procedure must be returned to <Step 1> after <Step 3> with an increased snapshot index by 1. Since there are matrix operations, the computational load of the adaptive procedure shown in this preferable embodiment is $O(N^2)$ where N is the number of antenna elements.

By utilizing one of the two preferable embodiments given above, it is possible to compute a weight vector that maximizes the signal to interference plus noise ratio. The required computational load in these two procedures given in the present invention is less than any conventional methods in computing the solution of the generalized eigen-problem. It also means the required computation time has tremendously reduced compared to the conventional techniques. The simplification of the computational procedure results in not only a conspicuous reduction of system price but also a remarkable improvement in the system performance. This invention provides a novel technique of reducing the complexity of the computational procedure without affecting the accuracy in the weight vector. It is possible to reduce the computational load by excluding the accumulations all the previous received signal vectors in computing the autocovariance matrices. It means the autocovariance matrices are computed only with the instantaneous signal vectors at each snapshot. Since the key idea of utilizing the instantaneous signal vectors for reducing the computational load has been already disclosed in our previous works, i.e., Korean patent 17931 (1996. 5. 25.), U.S. Pat. No. 5,808,913, only the adaptive procedure of computing the optimal weight vector is shown in this invention.

First, the simplified adaptive procedure of computing the eigenvector corresponding to the largest eigenvalue of (3) is introduced. Then, the adaptive procedure of computing the eigenvector corresponding to the smallest eigenvalue of (4) is easily be derived, as shown previously in this invention, by interchanging the signal index x (pre-correlation) and y (post-correlation) and changing the positive sign to the negative sign in (12).

Third Preferable Embodiment

The simplified adaptive procedure of computing the weight vector with an eigenvector corresponding to the largest eigenvalue of (3), excluding all the matrix operations, can be summarized as follows:

<Initial Stage> Set up an initial guess of the weight vector w. As in the other preferable embodiments, for a fast convergence, the received signal vector obtained at the output of the despreader, i.e., $y(0)/\|y(0)\|$, is recommended for the initial guess where $\|y(0)\| = \sqrt{(y^H(0)y(0))}$.

<Step 1> Compute the Lagrange multiplier $\lambda$ at the present snapshot from the present weight vector w, the received signal vectors x representing pre-correlation RX signal vector and y representing post-correlation RX signal vector, and a preset adaptive gain $\mu$ as follows:

$$\lambda = \frac{\lfloor b - \sqrt{(b^2 - ac)} \rfloor}{a} \quad (14)$$

where $a = \mu|\delta|^2 \alpha^2$, $b = |\delta|^2 \alpha + \mu\alpha\text{Re}[\gamma\delta z^*]$ and $c = \mu|\gamma|^2|z|^2\text{Re}[\gamma\delta z^*]$ with $x^H x \equiv \alpha$, $y^H y \equiv \beta$, $x^H y \equiv \gamma$, $w^H x \equiv \delta$, $z \equiv w^H y$ and the final array output z being $z = w^H y$.

<Step 2> Update the weight vector w with the present weight vector w, said Lagrange's multiplier $\lambda$, said adaptive gain $\mu$, said signal vectors x and y, said final array output z and $w^H x \equiv \delta$ as follows:

$$w \leftarrow w + \mu[yz^* - \lambda x\delta^*] \quad (15)$$

As in the previous preferable embodiment, the final array output z is obtained by $z = w^H y$. The weight vector is updated after the above written 2 steps have been executed at each snapshot. In order for the communication of the present invention to be continuously performed, the procedure must be returned to <Step 1> after <Step 2> with an increased snapshot index by 1. As in the previous preferable embodiments, it is possible to include an additional step for normalizing the weight vector to a unit magnitude after the update procedure shown in (15). In addition, in order to synchronize the phase of the signal at each antenna channel to the phase of the signal induced at the reference antenna element, it is recommended to normalize the weight vector after dividing every element of the resultant weight vector obtained in (15) by the weight corresponding to the reference antenna element. Since there is no matrix operation in the adaptive procedure of this preferable embodiment, the computational load of the adaptive procedure shown in this preferable embodiment is $O(N)$ where N is the number of antenna elements. It means that the optimal weight vector that maximizes the signal to interference plus noise ratio can be obtained only with the vector operations without any matrix operations.

Fourth Preferable Embodiment

As mentioned previously, instead of computing the eigenvector corresponding to the largest eigenvalue of (3), this embodiment introduces a simplified adaptive procedure of computing an eigenvector corresponding to the smallest eigenvalue of (4) as an optimal weight vector. As in the second preferable embodiment, the adaptive procedure can be derived from the third preferable embodiment by interchanging the signal index x representing pre-correlation and y representing post-correlation, and changing the sign when the weight vector is updated as shown in (12). The adaptive procedure can be summarized as follows.

<Initial Stage> Set up an initial guess for the weight vector w(0).

<Step 1> Compute the Lagrange multiplier λ at the present snapshot from the present weight vector w, the received signal vectors x (pre-correlation RX signal vector) and y (post-correlation RX signal vector), and a preset adaptive gain $\mu$ as follows:

$$\lambda = \frac{\lfloor b - \sqrt{(b^2 - ac)} \rfloor}{a} \quad (16)$$

where $a=\mu|z|^2\beta^2$, $b=-|z|^2\beta+\mu\beta\mathrm{Re}[z\delta^*\gamma^*]$ and $c=\mu|\gamma|^2|\delta|^2-2\mathrm{Re}[\gamma^*\delta^*z]$ with $x^H x \equiv \alpha$, $y^H y \equiv \beta$, $x^H y \equiv \gamma$, $w^H x \equiv \delta$ and the final array output z being $z=w^H y$.

<Step 2> Update the weight vector w with the present weight vector w, said Lagrange's multiplier λ, said adaptive gain $\mu$, said signal vectors x and y, said final array output z, and $w^H x \equiv \delta$, as follows:

$$w \leftarrow w - \mu[x\delta^* - \lambda y z^*] \quad (17)$$

As in the previous preferable embodiments, the final array output z is obtained by $z=w^H y$. The weight vector is updated after the above written 2 steps have been executed at each snapshot. In order for the communication of the present invention to be continuously performed, the procedure must be returned to Step 1> after <Step 2> with an increased snapshot index by 1. As in the previous preferable embodiments, it is possible to include an additional step for normalizing the weight vector to a unit magnitude after the update procedure shown in (17). In addition, in order to synchronize the phase of the signal at each antenna channel to the phase of the signal induced at the reference antenna element, it is recommended to normalize the weight vector after dividing every element of the resultant weight vector obtained in (17) by the weight corresponding to the reference antenna element. Since there is no matrix operation in the adaptive procedure of this preferable embodiment, the computational load of the adaptive procedure shown in this preferable embodiment is O(N) where N is the number of antenna elements. It means that the optimal weight vector that maximizes the signal to interference plus noise ratio can be obtained only with the vector operations without any matrix operations.

It is well known that the antenna array system includes a number of antenna elements, which are arranged according to a predetermined geometry. By appending a proper phase delay at each antenna channel, it is possible to control the beam pattern of a given antenna array system for either receiving signals or transmitting signals or both. The basic knowledge of the antenna array system has already been disclosed in prior arts released by the same inventor of this invention such as Korean patent (application number 893, 12171, 12172, 17931, 25377, and 73901 filed on Jan. 17, 1996, Apr. 18, 1996, Apr. 18, 1996, May 25, 1996, Jun. 28, 1996, and Dec. 26, 1997, respectively.). This invention is superior to the prior arts in terms of accuracy without loss of simplicity, which means that this invention provides an optimal weight vector which is more robust than that given by the prior arts without remarkably increasing the complexity.

The preferable embodiments and the figures given in this invention have been provided in order not to restrict the application of this invention within them. They have been given merely for an easy explanation of the techniques presented in this invention. Therefore, it is certain that various applications, replacements, and/or changes of this invention should also belong to this invention itself because it is straightforward that a normal engineer with a reasonable knowledge in the related fields can easily apply, replace, and/or change the techniques of this invention within the technical boundary of this invention. In addition, since it is possible to express this invention using different terminology, the applications, replacements, and/or changes of this invention that might be presented in different terminology should also belong to this invention.

It has been shown that an array system of which the weight vector is determined by an eigenvector corresponding to the largest eigenvalue of the autocovariance matrix of the received signals can reduce the BER nearly by one tenth of a normal receiving system having a single antenna, when the autocovariance matrix is formed with the despread signals only. This has already been published by the same inventor of this invention at [2] and [3]S. Choi, et al., "Design of an adaptive antenna array for tracking the source of maximum power and its application to CDMA mobile communications", IEEE trans on Antenna and Propagations, vol. 45, No 9, September 1997, pp. 1393–1404, and also in prior arts invented by the same inventor such as Korean patents (application number 893, 12171, 12172, 17931, 25377, and 73901 filed on Jan. 17, 1996, Apr. 18, 1996, Apr. 18, 1996, May 25, 1996, Jun. 28, 1996, and Dec. 26, 1997, respectively.). What is new in this invention is that the performance of the adaptive array system can further be improved by determining the weight vector from the solution of a generalized eigen-problem which includes the pre-correlation signals as well as the post-correlation signals, which are obtained at the output and input ports of the despreader, respectively. From the various computer simulations, though the amount of the improvement depends on a given signal environment, it seems possible to further reduce the BER nearly by a half by encountering the pre-correlation signals together with the post-correlation signals in accordance with the procedure described in this invention. However, it seems inevitable that the computational load is increased a little by appending the autocovariance matrix of the pre-correlation signals in the adaptive procedure. Besides the robustness, the technique provided in this invention has a linear complexity. More specifically speaking, the adaptive procedure given in this invention provides a solution of the generalized eigen-problem with a less amount of computation compared to any other methods that have been known in the world so far. The reduction of the computational load directly results in a superior competitiveness in price as well as a superior performance.

What is claimed is:

1. A signal processing method in a receiving array antenna system having plural antenna elements of predetermined arrangement and spacing between said antenna elements, wherein a final array output of said receiving array antenna system is obtained by a weight vector (w(k)), which is determined from an eigenvector corresponding to a maximum eigenvalue of generalized eigenvalue equation consisting of autocorrelation matrices of received signals, in accordance with the following relationship:

$$R_y(k)w(k)=\lambda R_x(k)w(k),$$

where $R_y(k)$ and $R_x(k)$ denote autocorrelation matrices of post-correlation and pre-correlation received signals which are respectively obtained after and before a despreading procedure of said receiving array antenna system at a k th snapshot with λ being the maximum eigenvalue of said generalized eigenvalue equation.

2. The signal processing method as recited in claim 1, wherein the weight vector of the antenna array system is obtained by:
- a) setting an initial weight vector w;
- b) updating present autocovariance matrices, $R_x$ and $R_y$, with received signals x(n) and y(n) at the present snapshot, which are pre-correlation and post-correlation received signal vectors, respectively;
- c) computing the Lagrange's multiplier $\lambda$ with the weight vector w, the autocovariance matrices $R_x$ and $R_y$, and preset the adaptive gain u at the present snapshot; and
- d) updating the weight vector with the current weight vector w, the Lagrange's multiplier $\lambda$, the adaptive gain $\lambda$, the autocovariance matrix $R_x$ of the pre-correlation signals, and the autocovariance matrix $R_y$ of the post-correlation signals.

3. The method as recited in claim 2, wherein one of the antenna elements located at the center of the array antenna is selected as a reference antenna element such that phases of signals of other antenna elements are synchronized to the phase of the signal of the antenna element located at the center of an array geometry.

4. The method as recited in claim 3, wherein the reference antenna element is located most closely from the center of the array geometry, when there is no element at the very center of the array geometry.

5. The method as recited in claim 3, wherein the phases of received signals at every antenna element are synchronized to the phase of a signal that would have been received at the center of the array geometry under an assumption that there is an imaginary antenna at the center of array geometry, when there is no antenna at the center of the array geometry.

6. The method as recited in claim 2, wherein the autocovariance matrix of the pre-correlation signals $R_x$ and the autocovariance matrix of the post-correlation signals $R_y$ are updated in accordance with mathematical operations, $R_x \leftarrow fR_x + x(n)x(n)^H$ and $R_y \leftarrow fR_y + y(n)y(n)^H$, respectively, wherein f is a preset forgetting factor, x(n) and y(n) are pre- and post-correlation signal vectors, respectively, and H denotes an Hermitian operator.

7. The method as recited in claim 2, wherein the autocovariance matrices $R_x$ and $R_y$ are obtained by $R_x = x(0)x(0)^H$ and $R_y = y(0)y(0)^H$, respectively, for the first snapshot.

8. The method as recited in claim 2, including the steps of:
- e) computing the Lagrange's multiplier $\lambda$ from the weight vector w, the autocovariance matrices $R_x$ and $R_y$, and the preset adaptive gain $\mu$, at the present snapshot, in accordance with $$\lambda = \frac{\lfloor b - \sqrt{(b^2 - ac)} \rfloor}{a},$$

where $$a = \mu w^H R_x^3 w, \quad b = \frac{(2w^H R_x^2 w + \mu w^H R_x^2 R_y w + \mu w^H R_y R_x^2 w)}{2},$$

$c = \mu w^H R_y R_x R_y w + w^H R_x R_y w + w^H R_y R_x w$; and
- f) updating the weight vector from the weight vector at the present snapshot w, the Lagrange's multiplier $\lambda$, the preset adaptive gain $\mu$, and the autocovariance matrices $R_x$ and $R_y$ in accordance with $w \leftarrow w + \mu[R_y w - \lambda R_x w]$.

9. The method as recited in claim 2, including the step of: normalizing the weight vector by $w^H R_x w = 1$ for the pre-correlation signal vector x and its autocovariance matrix $R_x$ whenever the weight vector is updated at each snapshot.

10. The method as recited in claim 2, wherein said step c) includes the step of computing the Lagrange's multiplier $\lambda$ from the weight vector at the present snapshot, the post-correlation signal vector y, and the its autocovariance matrix $R_y$ by $\lambda = w^H R_y w$.

11. The method as recited in claim 2, further including the steps of:
- e) computing the Lagrange's multiplier $\lambda$ from the weight vector w, the autocovariance matrices $R_x$ and $R_y$, and the preset adaptive gain $\mu$, at the present snapshot, in accordance with $$\lambda = \frac{\lfloor b - \sqrt{(b^2 - ac)} \rfloor}{a}$$

where $$a = \mu w^H R_y^3 w, \quad b = \frac{(-2w^H R_y^2 w + \mu w^H R_y^2 R_x w + \mu w^H R_x R_y^2 w)}{2}$$

and $c = \mu w^H R_x R_y R_x w - w^H R_y R_x w - w^H R_{xR_y} w$; and
- f) updating the weight vector from the weight vector at the present snapshot w, the Lagrange's multiplier $\lambda$, the preset adaptive gain $\mu$, and the autocovariance matrices $R_x$ and $R_y$ in accordance with $w \leftarrow w - \mu[R_x w - \lambda R_y w]$.

12. The method as recited in claim 11, further including the step of:
normalizing the weight vector by $w^H R_y w = 1$ for the post-correlation signal vector y and the its autocovariance matrix $R_y$ whenever the weight vector is updated at each snapshot.

13. The method as recited in claim 11, further including the step of:
computing the Lagrange's multiplier $\lambda$ from the weight vector at the present snapshot, the pre-correlation signal vector x, and the its autocovariance matrix $R_x$ by $\lambda = w^H R_x w$.

14. The signal processing method as recited in claim 1, wherein the weight vector of the antenna array system is obtained by:
- a) setting an initial weight vector w;
- b) computing the Lagrange's multiplier $\lambda$ from the pre-correlation signal vector x(n), post-correlation signal vector y(n), the weight vector w, and the preset adaptive gain $\mu$; and
- c) updating the weight vector from the weight vector at the present snapshot, the Lagrange's multiplier $\lambda$, the adaptive gain $\mu$, and the pre- and post-correlation signal vectors x(n) and y(n).

15. The method as recited in claim 14, wherein one of the antenna elements located at the center of the array antenna is selected as a reference antenna element such that phases of signals of other antenna elements are synchronized to the phase of the signal of the antenna element located at the center of an array geometry.

16. The method as recited in claim 15, wherein the reference antenna element is located most closely from the center of the array geometry, when there is no element at the very center of the array geometry.

17. The method as recited in claim 15, wherein the phases of received signals at every antenna element are synchronized to the phase of a signal that would have been received at the center of the array geometry under an assumption that there is an imaginary antenna at the center of array geometry, when there is no antenna at the center of the array geometry.

18. The method as recited in claim 14, including the steps of:

d) computing the Lagrange's multiplier $\lambda$ from the signal vectors x and y, and the weight vector w at the present snapshot, by $$\lambda = \frac{\lfloor b - \sqrt{(b^2 - ac)} \rfloor}{a}$$

where a, b, and c are obtained by $a=\mu|\delta|^2\alpha^2$, $b=|\delta|^2\alpha+\mu\alpha\mathrm{Re}[\gamma\delta z^*]$ and $c=\mu|\gamma|^2|z|^2+2\mathrm{Re}[\gamma\delta z^*]$, respectively, with $\alpha,\beta,\gamma,\delta$, and the final array output z being defined by $x^H x \equiv \alpha$, $y^H y \equiv \beta$, $x^H y \equiv \gamma$, $w^H x \equiv \delta$, and $z=w^H y$, respectively, and Re[°] denoting the real part of a complex quantity °; and e) updating the weight vector w from the weight vector w at the present snapshot, the Lagrange's multiplier $\lambda$, the adaptive gain $\mu$, the signal vectors x and y, the array output z, and the $\delta = w^H x$ by $w \leftarrow w + \mu[yz^* - \lambda x \delta^*]$.

19. The method as recited in claim 14, further including the step of:

normalizing the weight vector with respect to the pre-correlation signal vector x by $|w^H x|^2 = 1$.

20. The method as recited in claim 14, further including:

computing the Lagrange's multiplier from the array output z by $\lambda = |z|^2$.

21. The method as recited in claim 14, wherein said step (b) includes the steps of b1) computing the Lagrange's multiplier $\lambda$ from the signal vectors x and y, the weight vector w at the present snapshot, the preset adaptive gain $\mu$ by $$\lambda = \frac{\lfloor b - \sqrt{(b^2 - ac)} \rfloor}{a}$$

where a, b, and c are obtained by $a=\mu|z|^2\beta^2$, $b=-|z|^2\beta+\mu\beta\mathrm{Re}[z\delta^*\gamma^*]$, $c=\mu|\gamma|^2|\delta|^2-2\mathrm{Re}[\gamma^*\delta^*z]$, respectively, and $z=w^H y$, respectively, with $\alpha,\beta,\gamma,\delta$, and the final array output z being defined by $x^H x \equiv \alpha$, $y^H y \equiv \beta$, $x^H y \equiv \gamma$, $w^H x \equiv \delta$, and $z=w^H y$, respectively, and Re[°] denoting the real part of a complex quantity °; and b2) updating the weight vector w from the weight vector w at the present snapshot, the Lagrange's multiplier $\lambda$, the adaptive gain $\mu$, the signal vectors x and y, the array output z, and $\delta = w^H x$ by $w \leftarrow w - \mu[yz^* - \lambda x \delta^*]$.

22. The method as recited in claim 21, further including the step of:

normalizing the weight vector with respect to the post-correlation signal vector y by $|w^H y|^2 = 1$.

23. The method as recited in claim 21, including the step of:

computing the Lagrange's multiplier from the weight vector at the present snapshot and the pre-correlation signal vector x by $\lambda = |w^H x|^2$.

24. The method as recited in claim 14, further including the step of:

dividing each element of the weight vector by the element of the weight vector corresponding to the reference antenna element.

25. The method as recited in claim 14, further including the step of:

normalizing the magnitude of the weight vector to one.

26. The method as recited in claim 14, further including the step of:

normalizing the magnitude of the weight vector to an arbitrary quantity.

27. A signal processing apparatus in a receiving array antenna system having plural antenna elements with a predetermined arrangement and spacing between said antenna elements, the signal processing apparatus comprising:

signal processing means for computing a final array output of said receiving array antenna system based on a gain vector w(k), which is determined from an eigenvector corresponding to a maximum eigenvalue of a generalized eigenvalue equation consisting of autocorrelation matrices of received signals, in accordance with the following relationship:

$$R_y(k)w(k)=\lambda R_x(k)w(k),$$

where $R_y(k)$ and $R_x(k)$ denote autocorrelation matrices of post-correlation and pre-correlation received signals which are respectively obtained after and before a despreading procedure of said receiving array antenna system at a k th snapshot with $\lambda$ being a maximum eigenvalue of the generalized eigenvalue equation.

28. The signal processing apparatus as recited in claim 27, wherein said signal processing means includes:

means for setting an initial weight vector w;

means for updating present autocovariance matrices, $R_x$ and $R_y$, with respect to x(n) and y(n) at the present snapshot, which are pre-correlation and post-correlation received signal vectors, respectively;

means for computing the Lagrange's multiplier $\lambda$ with the weight vector w, the autocovariance matrices $R_x$ and $R_y$, and the preset adaptive gain $\mu$ at present snapshot; and means for updating the weight vector with current the weight vector w, the Lagrange's multiplier $\lambda$, the adaptive gain $\lambda$, the autocovariance matrix $R_x$ of the pre-correlation signals, and the autocovariance matrix $R_y$ of the post-correlation signals.

29. The apparatus as recited in claim 28, wherein one of the antenna elements located at the center of the array antenna is selected as a reference antenna element such that phases of signals of other antenna elements are synchronized to the phase of the signal of the antenna element located at the center of an array geometry.

30. The method as recited in claim 29, wherein the reference antenna element is located most closely from the center of the array geometry, when there is no element at the very center of the array geometry.

31. The apparatus as recited in claim 29, wherein the phases of received signals at every antenna element are synchronized to the phase of a signal that would have been received at the center of the array geometry under an assumption that there is an imaginary antenna at the center of array geometry, when there is no antenna at the center of the array geometry.

32. The apparatus as recited in claim 28, wherein the autocovariance matrix of the pre-correlation signals $R_x$ and the autocovariance matrix of the post-correlation signals $R_y$ are updated in accordance with mathematical operations, $R_x \leftarrow fR_x + x(n)x(n)^H$ and $R_y \leftarrow fR_y + y(n)y(n)^H$, respectively, where f is a preset forgetting factor, x(n) and y(n) are the pre- and post-correlation signal vectors, respectively, and the superscript denotes the Hermitian operator.

33. The apparatus as recited in claim 28, wherein the autocovariance matrices, $R_x$ and $R_y$, are determined by $R_x = x(0)x(0)^H$ and $R_y = y(0)y(0)^H$, respectively, for the first snapshot.

34. The apparatus as recited in claim 28, wherein said means for computing the Lagrange's multiplier includes:

a means for computing the Lagrange's multiplier $\lambda$ from the weight vector w, the autocovariance matrices $R_x$ and $R_y$, and the preset adaptive gain $\mu$, at the present snapshot, in accordance with $$\lambda = \frac{\lfloor b - \sqrt{(b^2 - ac)} \rfloor}{a},$$

where $a = \mu w^H R_x^3 w$, $$b = \frac{(2w^H R_x^2 w + \mu w^H R_x^2 R_y w + \mu w^H R_y R_x^2 w)}{2} \text{ and}$$

$$c = \mu w^H R_y R_x R_y w + w^H R_x R_y w + w^H R_y R_x w;$$

and a means for updating the weight vector from the weight vector at the present snapshot w, the Lagrange's multiplier $\lambda$, the preset adaptive gain $\mu$, and the autocovariance matrices $R_x$ and $R_y$ in accordance with $w \leftarrow w + \mu[R_y w - \lambda R_x w]$.

35. The apparatus as recited in claim 28, including:

a means for normalizing the weight vector by $w^H R_x w = 1$ for the pre-correlation signal vector x and its autocovariance matrix $R_x$ whenever the weight vector is updated at each snapshot.

36. The apparatus as recited in claim 20, including:

a means for computing the Lagrange's multiplier $\lambda$ from the weight vector at the present snapshot, the post-correlation signal vector y, and the its autocovariance matrix $R_y$ by $\lambda = w^H R_y w$.

37. The apparatus as recited in claim 28, further comprising:

a means for computing the Lagrange's multiplier $\lambda$ from the weight vector w, the autocovariance matrices $R_x$ and $R_y$, and the preset adaptive gain $\mu$, at the present snapshot, in accordance with $$\lambda = \frac{\lfloor b - \sqrt{(b^2 - ac)} \rfloor}{\alpha}$$

where $\alpha = \mu w^H R_y^3 w$, $$b = \frac{(-2w^H R_y^2 w + \mu w^H R_y^2 R_x w + \mu w^H R_x R_y^2 w)}{2}$$

and a means for updating the weight vector from the weight vector at the present snapshot w, the Lagrange's multiplier $\lambda$, the preset adaptive gain $\mu$, and the autocovariance matrices $R_x$ and $R_y$ in accordance with $w \leftarrow w - \mu[R_x w - \lambda R_y w]$.

38. The apparatus as recited in claim 37, further including:

a means for normalizing the weight vector by $w^H R_y w = 1$ for the post-correlation signal vector y and the its autocovariance matrix $R_y$ whenever the weight vector is updated at each snapshot.

39. The apparatus as recited in claim 37, including:

a means for computing the Lagrange's multiplier $\lambda$ from the weight vector at the present snapshot, the pre-correlation signal vector x, and the its autocovariance matrix $R_x$ by $\lambda = w^H R_x w$.

40. The signal processing apparatus as recited in claim 27, wherein said signal processing means includes:

means for setting an initial weight vector w;

means for computing the Lagrange's multiplier $\lambda$ from the pre-correlation signal vector x(n), the post-correlation signal vector y(n), the weight vector w, and the preset adaptive gain $\mu$; and means for updating the weight vector from the weight vector at the present snapshot, the Lagrange's multiplier $\lambda$, the adaptive gain $\mu$, and the pre- and post-correlation signal vectors x(n) and y(n).

41. The apparatus as recited in claim 40, wherein one of the antenna elements located at the center of the array antenna is selected as a reference antenna element such that phases of signals of other antenna elements are synchronized to the phase of the signal of the antenna element located at the center of an array geometry.

42. The apparatus as recited in claim 41, wherein the reference antenna element is located most closely from the center of the array geometry, when there is no element at the very center of the array geometry.

43. The apparatus as recited in claim 41, wherein the phases of received signals at every antenna element are synchronized to the phase of a signal that would have been received at the center of the array geometry under an assumption that there is an imaginary antenna at the center of array geometry, when there is no antenna at the center of the array geometry.

44. The apparatus as recited in claim 40, including:

a means for computing the Lagrange's multiplier $\lambda$ from the signal vectors x and y, the weight vector w at the present snapshot, by $$\lambda = \frac{\lfloor b - \sqrt{(b^2 - ac)} \rfloor}{a}$$

where a, b, and c are obtained by $a = \mu|\delta|^2 \alpha^2$, $b = |\delta|^2 \alpha + \mu \alpha \text{Re}[\gamma \delta z^*]$, $c = \mu|\gamma|^2|z|^2 + 2\text{Re}[\gamma \delta z^*]$, respectively, with $\alpha$, $\beta$, $\gamma$, $\delta$, and the final array output z being defined by $x^H x \equiv \alpha$, $y^H y \equiv \beta$, $x^H y \equiv \gamma$, $w^H x \equiv \delta$, and $z = w^H y$, respectively, and $\text{Re}[°]$ denoting the real part of a complex quantity °; and a means for updating the weight vector w from the weight vector w at the present snapshot, the Lagrange's multiplier $\lambda$, the adaptive gain $\mu$, the signal vectors x and y, the array output z, and $\delta = w^H x$ by $w \leftarrow w + \mu[yz^* - \lambda x \delta^*]$.

45. The apparatus as recited in claim 40, further including, a means for normalizing the weight vector with respect to the pre-correlation signal vector x by $|w^H x|^2 = 1$.

46. The apparatus as recited in claim 40, including:

a means for computing the Lagrange's multiplier from the array output z by $\lambda = |z|^2$.

47. The apparatus as recited in claim 40, wherein said means for computing the weight vector includes:

a means for computing the Lagrange's multiplier $\lambda$ from the signal vectors x and y, the weight vector w at the present snapshot, the preset adaptive gain $\mu$ by $$\lambda = \frac{\lfloor b - \sqrt{(b^2 - ac)} \rfloor}{a},$$

where a, b, and c are obtained by $a=\mu|z|^2\beta^2$, $b=-|z|^2\beta+\mu\beta\text{Re}[z\delta^*\gamma^*]$, $c=\mu|\gamma|^2|\delta|^2-2\text{Re}[\gamma^*\delta^*z]$, respectively, and $z=w^H y$, respectively, with $\alpha,\beta,\gamma,\delta$, and the final array output z being defined by $x^H x \equiv \alpha$, $y^H y \equiv \beta$, $x^H y \equiv \gamma$, $w^H x \equiv \delta$, and $z=w^H y$, respectively, and Re[°] denoting the real part of a complex quantity °; and a means for updating the weight vector w from the weight vector w at the present snapshot, the Lagrange's multiplier $\lambda$, the adaptive gain $\mu$, the signal vectors x and y, the array output z, and $\delta \equiv w^H x$ by $w \leftarrow w - \mu[yz^* - \lambda x\delta^*]$.

48. The apparatus as recited in claim 47, further including:
a means for normalizing the weight vector with respect to the post-correlation signal vector y by $|w^H y|^2 = 1$.

49. The apparatus as recited in claim 47, including:
a means for computing the Lagrange's multiplier from the weight vector at the present snapshot and the pre-correlation signal vector x by $\lambda = |w^H x|^2$.

50. The apparatus as recited in claim 40, further including:
a means for dividing each element of the weight vector by the element of the weight vector corresponding to the reference antenna element.

51. The apparatus as recited in claim 40, further including:
a means for normalizing the magnitude of the weight vector to one.

52. The apparatus as recited in claim 40, further including:
a means for normalizing the magnitude of the weight vector to an arbitrary quantity.

53. A computer-readable medium for computing a weight vector of an antenna array system which includes an array antenna having antenna elements and signal processing apparatus performing frequency-down conversion, demodulation, and despreading of received signals, comprising the functions of:

a) setting an initial weight vector w;

b) updating present autocovariance matrices, $R_x$ and $R_y$, with received signals x(n) and y(n) at the present snapshot, which are pre-correlation and post-correlation received signal vectors, respectively;

c) computing the Lagrange's multiplier $\lambda$ with the weight vector w, the autocovariance matrices $R_x$ and $R_y$, and preset the adaptive gain $\mu$ at present snapshot; and d) updating the weight vector with current the weight vector w, the Lagrange's multiplier $\lambda$, the adaptive gain $\lambda$, the autocovariance matrix $R_x$ of the pre-correlation signals, and the autocovariance matrix $R_y$ of the post-correlation signals.

54. A computer-readable medium for computing a weight vector of an adaptive antenna array system, which includes an array antenna having antenna elements and signal processing apparatus performing frequency-down conversion, demodulation, and despreading of received signals, comprising the functions of:

a) setting an initial weight vector w;

b) computing the Lagrange's multiplier $\lambda$ from the pre-correlation signal vector x(n), post-correlation signal vector y(n), the weight vector w, and the preset adaptive gain $\mu$; and c) updating the weight vector from the weight vector at the present snapshot, the Lagrange's multiplier $\lambda$, the adaptive gain $\mu$, and the pre- and post-correlation signal vectors x(n) and y(n).

* * * * *

UNITED STATES PATENT AND TRADEMARK OFFICE
CERTIFICATE OF CORRECTION

PATENT NO. : 6,462,709 B1
DATED : October 8, 2002
INVENTOR(S) : S. Choi

It is certified that error appears in the above-identified patent and that said Letters Patent is hereby corrected as shown below:

Column 12,
Line 25, "$w^H R_{xRy}$" should be -- $w^H R_x R_y$ --.

Column 15,
Line 35, "claim 20" should be -- claim 28 --.

Signed and Sealed this

Twenty-ninth Day of July, 2003

JAMES E. ROGAN
*Director of the United States Patent and Trademark Office*